(12) United States Patent
Nishioka (10) Patent No.: US 7,688,522 B2
(45) Date of Patent: Mar. 30, 2010

(54) LENS AND OPTICAL SYSTEM

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 846 days.

(21) Appl. No.: 11/409,434

(22) Filed: Apr. 21, 2006

(65) Prior Publication Data

US 2006/0238897 A1 Oct. 26, 2006

(30) Foreign Application Priority Data

Apr. 21, 2005 (JP) .............................. 2005-123668

(51) Int. Cl.
*G02B 3/02* (2006.01)
*G02B 13/18* (2006.01)

(52) U.S. Cl. .................. 359/708; 359/709; 359/710; 359/711; 359/712

(58) Field of Classification Search ......... 359/708–712, 359/722
See application file for complete search history.

(56) References Cited

U.S. PATENT DOCUMENTS

2006/0077566 A1* 4/2006 Nishioka .................... 359/708

* cited by examiner

*Primary Examiner*—Evelyn A. Lester
(74) *Attorney, Agent, or Firm*—Kenyon & Kenyon LLP (57) ABSTRACT

A lens has a convex or concave shaped smooth non-spherical surface or non-circular curve which is formed of a medium indicating negative refraction.

27 Claims, 7 Drawing Sheets

LENS AND OPTICAL SYSTEM

CROSS-REFERENCE TO RELATED APPLICATIONS

This application is based upon and claims the benefit of priority from prior Japanese Patent Application No. 2005-123668, filed Apr. 21, 2005, the entire contents of which are incorporated herein by reference.

BACKGROUND OF THE INVENTION

1. Field of the Invention

The present invention relates to a lens and an optical system including the lens, and an optical device including the lens.

2. Description of the Related Art

Conventionally, there have been well known: an optical elements that uses a light wave or electromagnetic wave; optical systems such as an image pickup optical system, an observation optical system, a projection optical system, and a signal processing system; and an optical device that uses these systems. These optical systems have a defect that image resolution is limited because of diffraction that occurs due to undulation property of a light wave or electromagnetic wave.

Therefore, as a technique for achieving image formation which exceeds the diffraction limit, use of a negative refractive index medium is disclosed in the following non-patent documents 2 and 5, etc.

Figure 10:
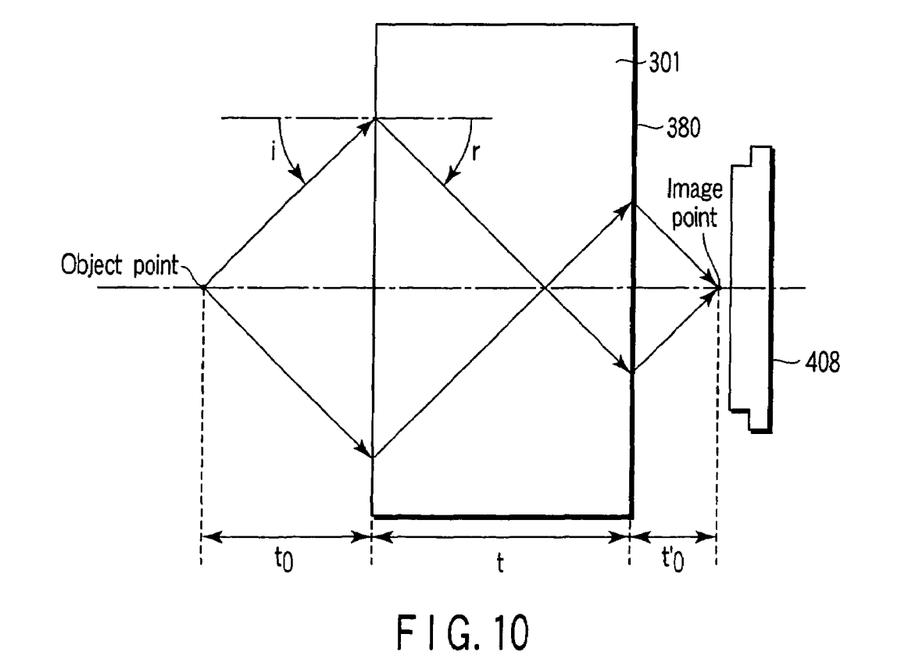
FIG. 10 is a view for explaining image formation using a parallel flat plate 380 formed of a negative refractive index medium 301.

FIG. 10 is a view for explaining an example of a technique for achieving such image formation. This figure shows image formation using a parallel flat plate 380 formed of a negative refractive index medium 301. In FIG. 10, $t_0$ denotes a distance between an object point and a left side face of the flat plate 380; $t_0$, denotes a distance between an image point and a right side face of the flat plate 380; "t" denotes a thickness of the flat plate 380; "i" denotes an incident angle; "r" denotes a refraction angle; and $n_s$ denotes a refractive index of the negative refractive index medium 301 with respect to a vacuum.

Figure 1:
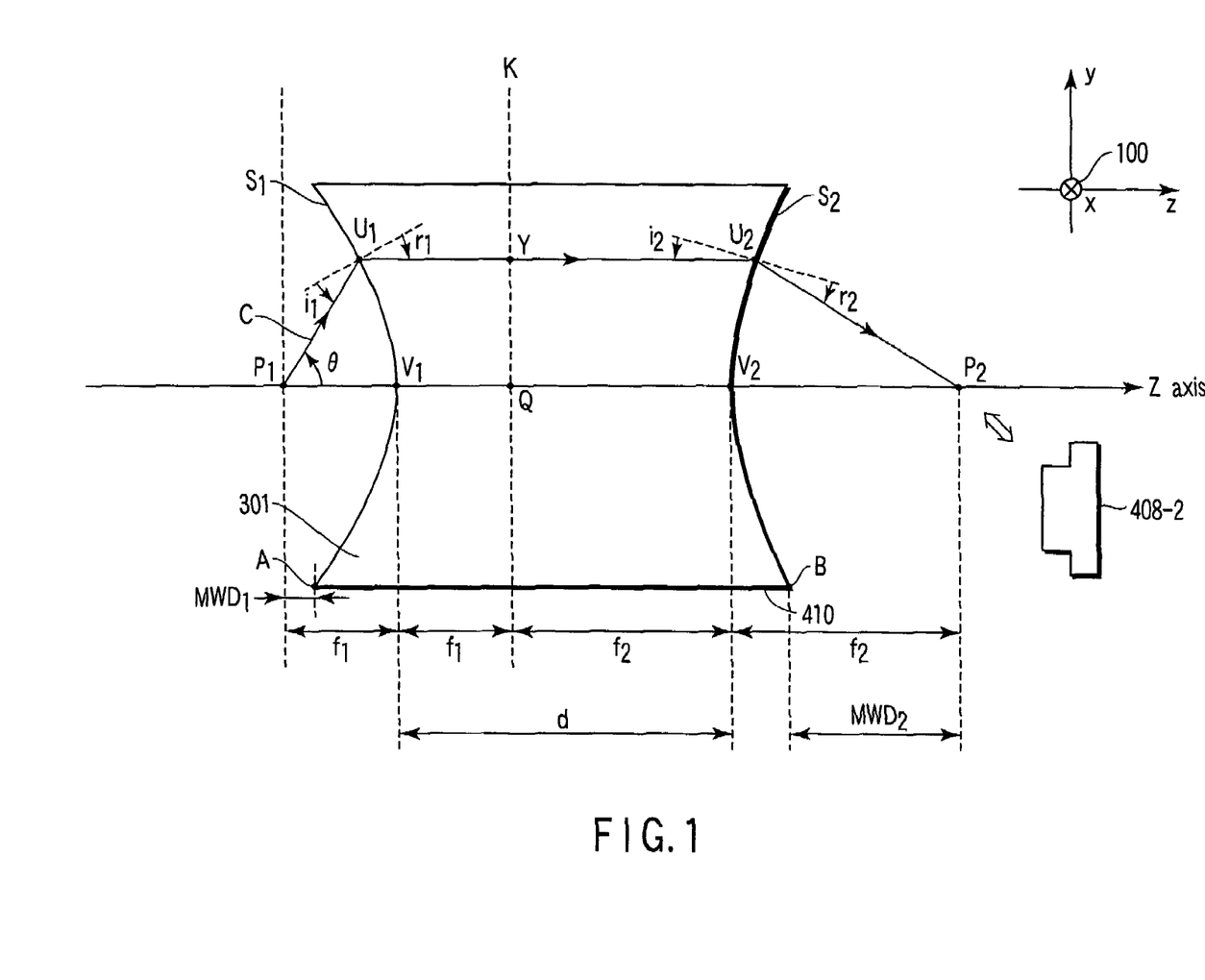
FIG. 1 is a view for explaining a first embodiment of the present invention.

A refractive index of the periphery of the flat plate 380 with respect to a vacuum is $n_0$, and $n_0=1$ is established in the case of a vacuum. FIG. 1 shows a case in which $n_0=1$ and $n_s=-1$ are established.

The arrow indicates an emitted light component from among the light beams emitted from an object. Because a refraction law is established according to non-patent document 2, the following formula is established:

$n_0 \sin i = n_s \sin r$      Formula 101

Assuming that $n_0=1$ and $n_s=-1$, the following formula is established:

$r = -i$      Formula 102

Therefore, a light beam of the emitted light component is formed as an image point at a point at which $t_0$, satisfies the following formula:

$t_0 + t_0' = t$      Formula 103

On the other hand, an evanescent wave produced from an object point has intensity equal to that of the object point at a point at which $t_0$, satisfies Formula 103 as well. All the light beams emitted from the object point are collected at the image point, and thus, image formation exceeding the diffraction limit is achieved. This is referred to as complete image formation. It is known from non-patent document 2 listed below that, even if the periphery of the negative refractive index medium 301 is not a vacuum, complete image formation is achieved when Formula 103 and Formula 104 are satisfied:

$n_s = -n_0$      Formula 104

Non-patent document 1: Mechanism and application of optical system, 73-77, 166-170, Optronics Co., Ltd., 2003

Non-patent document 2: J. B. Pendry Phys. Rev. Lett., Vol. 85, 18 (2000) 3966-3969

Non-patent document 3: M. Notomi Phys. Rev. B. Vol. 62 (2000) 10696

Non-patent document 4: V. G. Veselago Sov. Phys. Usp. Vol. 10, 509-514 (1968)

Non-patent document 5: L. Liu and S. He Optics Express Vol. 12 No. 20 4835-4840 (2004)

Non-patent document 6: Sato & Kawakami, Optronics, July, 2001, page 197

Patent document 1: US 2003/0227415 A1

Patent document 2: US 2002/0175693 A1

BRIEF SUMMARY OF THE INVENTION

According to a first aspect of the present invention, there is provided a lens formed of a medium indicating negative refraction, having a convex or concave shaped smooth non-spherical surface or a non-circle curve.

According to a second aspect of the present invention, there is provided a lens having two optical surfaces formed of a medium indicating negative refraction, one of which is a rotational paraboloid, a rotational hyperboloid, a parabola, or a hyperbolic curve.

According to a third aspect of the present invention, there is provided a lens formed of a medium indicating negative refraction, having a convex shaped rotational paraboloid or rotational paraboloid, or alternatively, a convex shaped parabola or hyperbolic curve.

According to a fourth aspect of the present invention, there is provided a lens formed of a medium indicating negative refraction, having a convex shaped rotational paraboloid or rotational hyperboloid, or alternatively, a convex shaped parabola or hyperbolic curve and a flat surface.

According to a fifth aspect of the present invention, there is provided a lens having two optical surfaces formed of a medium indicating negative refraction, one of which is a concave shaped rotational paraboloid or rotational hyperboloid, or alternatively a parabola or hyperbolic curve.

According to a sixth aspect of the present invention, there is provided a lens formed of a medium indicating negative refraction, having a double concave shape, each of the double concave shape constituting a rotational paraboloid, the two rotational paraboloids sharing a common axis whose convex surfaces are opposed to each other.

According to a seventh aspect of the present invention, there is provided a lens having a double concave shape formed of a medium indicating negative refraction and having two spherical surfaces whose concave surfaces are opposite to each other, wherein, when respective curvature radiuses of the spherical surfaces are $R_1$ and $R_2$, a gap between the two surfaces satisfies the following formula $0.5(f_1+f_2) < d < 2(f_1+f_2)$      Formula 165-6 wherein $f_1$ is defined as a distance between $P_1$ and $V_1$, and $f_2$ is defined as a distance between $P_2$ and $V_2$, wherein $P_1$ is a focal point of a paraboloid of the curved surface $S_1$ and $P_2$ is a focal point of a paraboloid of the curved surface $S_2$, and $V_1$ is a cross point between the Z axis and the curved surface $S_1$, and $V_2$ is a cross point between the Z axis and the curved surface $S_2$.

According to an eighth aspect of the present invention, there is provided a lens formed of a medium indicating negative refraction, the lens having a double concave shape, wherein a rotational hyperboloid and a spherical surface are arranged such that respective convex surfaces thereof are opposed to each other.

According to a ninth aspect of the present invention, there is provided a lens formed of a medium indicating negative refraction, having a convex shaped rotational paraboloid or rotational hyperboloid, or alternatively, a convex shaped parabola or parabolic curve.

According to a tenth aspect of the present invention, there is provided a lens formed of a medium indicating negative refraction, one surface of the lens having a convex shaped rotational hyperboloid or a convex shaped hyperbolic curve, and the other surface of the lens having a flat surface.

According to an eleventh aspect of the present invention, there is provided an optical system having two lenses each of which is formed of a medium indicating negative refraction, which have a convex shaped rotational paraboloid or a convex shaped parabolic curve, wherein a convex surface of the rotational paraboloid or the parabola are opposed to each other.

According to a twelfth aspect of the present invention, there is provided an optical system having two lenses each of which is formed of a medium indicating negative refraction, having a convex shaped rotational paraboloid or a convex shaped parabolic curve at one surface and a flat surface at the other surface, wherein convex surfaces of the rotational paraboloids or the parabolas of the two lenses are opposed to each other.

According to a thirteenth aspect of the present invention, there is provided an optical system having an optical element made of a medium indicating negative refraction, wherein the optical system includes a spherical surface shaped optical surface and satisfies the following formulas $$-30\lambda \leq \delta \int_E^G n(r)ds \leq 30\lambda \text{ and} \quad \text{Formula 200-3}$$

$$-30\lambda \leq \int_E^G n(r)ds \leq 30\lambda \quad \text{Formula 203-3}$$

wherein $\lambda$ denotes a wavelength of a light beam to be used, $\delta$ represents a variation of an optical path, n(r) represents a refractive index in a positional vector r on the optical path, and "ds" represents a line element along the optical path.

According to a fourteenth aspect of the present invention, there is provided an optical system including a medium indicating negative refraction and a medium having a positive refractive index, wherein the optical system includes a spherical surface shaped optical surface and satisfies the following formulas $$-30\lambda \leq \delta \int_E^G n(r)ds \leq 30\lambda \text{ and} \quad \text{Formula 200-3}$$

$$-30\lambda \leq \int_E^G n(r)ds \leq 30\lambda \quad \text{Formula 203-3}$$

wherein $\lambda$ denotes a wavelength of a light beam to be used, $\delta$ represents a variation of an optical path, n(r) represents a refractive index in a positional vector r on the optical path, and "ds" represents a line element along the optical path.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, preferred embodiments of the present invention will be described in detail with reference to the accompanying drawings.

FIG. 1 is a view for explaining a first embodiment of the present invention. A lens 410 is formed of a negative refractive index medium 301 comprising curved surfaces $S_1$ and $S_2$ as two optical surfaces. In the case of three dimensions, $S_1$ and $S_2$ are formed in the shape of a rotational paraboloid with a Z axis being a rotary axis. These curved surfaces are arranged such that convex surfaces sharing two axes are opposed to each other. In the case of two dimensions, $S_1$ and $S_2$ are provided as parabolas with the Z axis being an axis.

Hereinafter, although a description will be given with respect to the case of three dimensions, this description is also applicable to the case of two dimensions. In FIG. 1, a positive direction of an x axis is provided as a direction oriented from top to bottom of paper. A symbol designated by reference numeral 100 represents this direction. A focal point of a paraboloid of the curved surface $S_1$ is defined as $P_1$. A focal point of a paraboloid of the curved surface $S_2$ is defined as $P_2$. $P_1$ and $P_2$ are present on a Z axis. The Z axis is defined as an optical axis. A cross point between the Z axis and the surface $S_1$ is defined as $V_1$. A cross point between the Z axis and the surface $S_2$ is defined as $V_2$. A distance between $P_1$ and $V_1$ is defined as $f_1$. A distance between $P_2$ and $V_2$ is defined as $f_2$. At this time, $f_1 > 0$ and $f_2 > 0$ are established.

A reference surface is represented by K (in the case of two dimensions, K is a base line.) A cross point between K and the Z axis is defined as Q. K is orthogonal to the Z axis at Q. Then, it is better to select a distance d between $V_1$ and $V_2$ such that a distance between $V_1$ and Q is equal to $f_1$ and a distance between $V_2$ and Q is equal to $f_2$. d denotes a thickness of the lens 410.

Let us consider a light beam C emitted from $P_1$, the beam forming an angle $\theta$ with respect to the Z axis. A cross point between C and $S_1$ is defined as $U_1$. A cross point between C and $S_2$ is defined as $U_2$. An incident angle of C at the point $U_1$ is defined as $i_1$. A refraction angle of C at the point $U_1$ is defined as $r_1$. An incident angle of C at the point $U_2$ is defined as $i_2$. A refraction angle of C at the point $U_2$ is defined as $r_2$.

A refractive index of the negative refractive index medium 301 with respect to a vacuum is defined as $n_s$. A refractive index of the medium at the periphery of the lens 410 with respect to a vacuum is defined as $n_0$. A cross point between C and K is defined as Y.

Now, in FIG. 1, a case in which the following formula is established is considered:

$$n_s = -n_0 \qquad \text{Formula 104}$$

In accordance with the refraction law, the following formula is established:

$$n_s \sin r_1 = n_0 \sin i_1 \qquad \text{Formula 160}$$

Thus, using Formula 104, the following formula is obtained:

$$r_1 = -i_1 \qquad \text{Formula 161}$$

Then, the surface $S_1$ is provided as a rotational paraboloid with $P_1$ being a focal point, and thus, the light beam C after refracted becomes parallel to the Z axis on the surface $S_1$.

Namely, the line segments $U_1$ and $U_2$ are parallel to the Z axis (Hereinafter, in the case where two symbols representing points are referred together, these symbols are assumed to represent a line segment connecting two points with each other, and the term "line segment" is not omitted.).

With respect to refraction at the point $U_2$, the following formula is established similarly:

$$r_2 = -i_2 \qquad \text{Formula 162}$$

Therefore, at $S_2$, C after refracted passes through $P_2$ that is a focal point of the surface $S_2$.

The above formula is established with respect to an arbitrary angle $\theta$. Accordingly, assuming that an object point is placed at the point $P_1$, the emitted light components of all the light beams emitted from the object point are formed as an image at $P_2$ with no aberration.

At this time, an image forming magnification $\beta$ is given by the following formula:

$$\beta = -\frac{f_2}{f_1} \qquad \text{Formula 163}$$

Since $f_1$ and $f_2$ can be arbitrarily selected by changing the shape of surfaces $S_1$ and $S_2$, an image forming optical system with no aberration, the optical system having an arbitrary magnification, can be obtained by using the lens 410.

It is better to establish the following formula because a magnified image or a reduced image can be obtained:

$$|\beta| \neq 1 \qquad \text{Formula 163-2}$$

It is still better to establish the following formula because a large magnified image can be obtained:

$$|\beta| > 2 \qquad \text{Formula 163-3}$$

It is further better to establish the following formula:

$$|\beta| > 5 \qquad \text{Formula 163-4}$$

It is still further better to establish the following formula because a reduced image can be obtained:

$$|\beta| > \tfrac{1}{2} \qquad \text{Formula 163-5}$$

It is better to establish the following formula:

$$|\beta| < \tfrac{1}{5} \qquad \text{Formula 163-6}$$

Of course, it is allowed to establish the following formula:

$$|\beta| = 1 \qquad \text{Formula 163-7}$$

The system shown in FIG. 1 can be used for an objective lens of a microscope, a stepper, an optical disk, a television camera, a digital camera, an optical LSI and the like.

As an embodiment, the following settings are provided:

$f_1 = 1$ mm $f_2 = 5$ mm $d = 6$ mm $n_0 = 1$ (vacuum)

$n_s = -1$

NA (incident side numerical aperture 0.98)

$MWD_1 = 0.2$ mm, $MWD_2 = 4$ mm $\beta = -5$ $\lambda = 488$ nm ($\lambda$ denotes an optical wavelength)

Here, MWD denotes a mechanical working distance. A distance obtained by measuring a length between $P_1$ and a portion A that is the closest to $P_1$ of the lens 410 in parallel to the Z axis is defined as $MWD_1$. If the portion A is present at the right side from $P_1$, a flat surface on which an object is present can be observed without collision with the lens 410. Therefore, it is desirable that the following formula is established:

$$MWD_1 > 0 \qquad \text{Formula 164}$$

It is still better to establish the following formula:

$$MWD_1 > 0.1 \text{ mm} \qquad \text{Formula 165}$$

$MWD_2$ denotes a distance obtained by measuring a length between $P_2$ and a portion B that is the closest to $P_2$ of the lens 410 in parallel to the Z axis. In order to avoid colliding between an image flat surface and the lens 410, it is desirable that the following formula is established:

$$MWD_2 > 0 \qquad \text{Formula 164-2}$$

It is still better to establish the following formula:

$$MWD_2 > 0.1 \text{ mm} \qquad \text{Formula 165-2}$$

The following formula is also established, but a slight error is allowed:

$$d = f_1 + f_2 \qquad \text{Formula 165-3}$$

Image formation with high precision can be achieved when the following formula is established:

$$0.9(f_1+f_2) < d < 1.1(f_1+f_2) \qquad \text{Formula 165-4}$$

Practically sufficient image formation can be achieved when the following formula is established:

$$0.7(f_1+f_2) < d < 1.3(f_1+f_2) \qquad \text{Formula 165-5}$$

Depending on usage, the following formula will suffice:

$$0.5(f_1+f_2)<d<2(f_1+f_2) \quad \text{Formula 165-6}$$

Now, let us consider an optical path length of a light beam emitted from an object point placed at $P_1$.

From a definition of a paraboloid or a parabola, the following formulas are established:

$$P_1U_1=U_1Y \quad \text{Formula 166}$$

$$YU_2=U_2P_2 \quad \text{Formula 167}$$

Therefore, the following formula is obtained:

$$P_1U_1+U_2P_2=U_1Y+YU_2 \quad \text{Formula 168}$$

In a positive refractive index medium, an evanescent wave increases in an exponential manner. In a negative refractive index medium, an evanescent wave decreases in an exponential manner.

The right side of Formula 168 is an optical path length in a positive refractive index medium while the left side of Formula 168 is an optical path length in a negative refractive index medium. Since both of these sides are equal to each other and Formula 104 is established, a sum of all the optical path lengths is 0. It is better to establish the following formula:

$$0.8<\left|\frac{n_s}{n_0}\right|<1.2 \quad \text{Formula 169}$$

This is because, as long as a value of $|n_s/n_0|$ is within the above range, the lowering of image formation performance is less. Depending on usage of an optical system, it is better to establish the following formula:

$$0.5<\left|\frac{n_s}{n_0}\right|<1.6 \quad \text{Formula 169-2}$$

For the purpose of image formation with no aberration for radiation completion, Formula 165-3, Formula 165-4, and Formula 165-5 may not be satisfied.

In an example shown in FIG. 1, a refractive index may be inverted. Namely, the left side space with respect to $S_1$ may be filled with a negative refractive index medium, the right side space from $S_2$ may be filled with a negative refractive index medium, and a space between $S_1$ and $S_2$ may be filled with a positive refractive index medium. As long as Formula 104 is established, image formation with no aberration is achieved.

Figure 2:
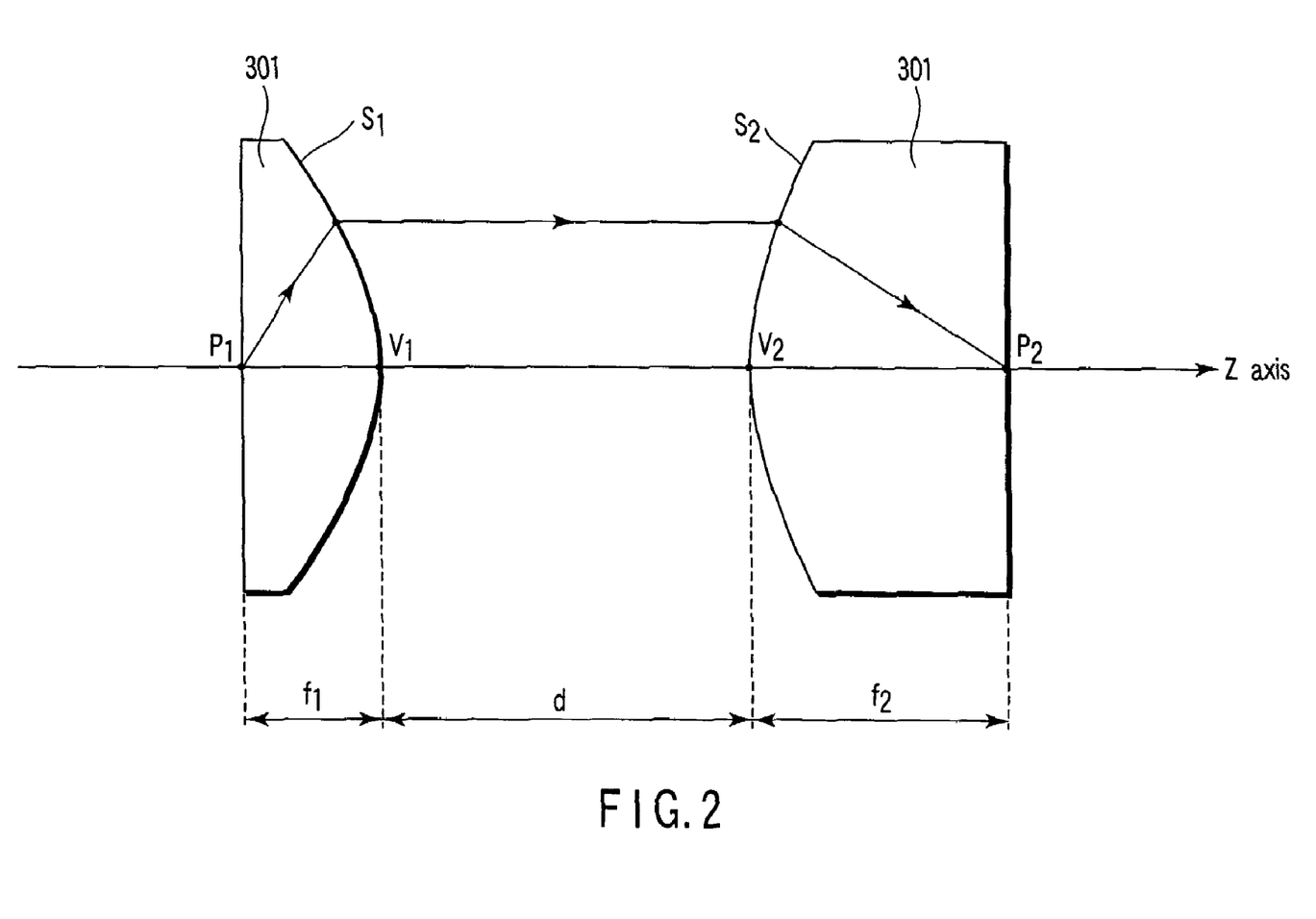
FIG. 2 is a view showing a modified example of the first embodiment.

Alternatively, a space at the left side with respect to $S_1$ and at the right side from a flat surface passing through $P_1$ and vertical to the Z axis, may be filled with a negative refractive index medium to produce one lens; a space at the right side from $S_2$ and being at the right side from a flat surface passing through $P_2$ and vertical to the Z axis may be filled with a negative refractive index medium to produce another lens; and a space between $S_1$ and $S_2$ may be filled with a positive refractive index medium. As long as Formula 104 is established, image formation with no aberration is achieved. This appearance is shown in FIG. 2.

Although in the lens 410 shown in FIG. 1, the shape of the surfaces $S_1$ and $S_2$ has been a rotational paraboloid, this shape may be approximated by a spherical surface.

When a curvature radius of the surface $S_1$ is defined as $R_1$, and a curvature radius of the surface $S_2$ is defined as $R_2$, $R_1<0$ and $R_2>0$ are established, and the following formula is established:

$$f_1=\left|\frac{R_1}{2}\right| \quad \text{Formula 170}$$

$$f_2=\left|\frac{R_2}{2}\right| \quad \text{Formula 171}$$

It is still better to establish the following formula:

$$d=1/2(|R_1|+|R_2|) \quad \text{Formula 172}$$

In the case of two dimensions, a circle may be placed instead of a spherical surface. Formula 165-3, Formula 165-4, Formula 165-5, and Formula 165-6 are established in both of the cases of a circle and a spherical surface.

In the example shown in FIG. 1, an image pickup device is produced by placing an image pickup element 408-2 at a position $P_2$. This device is featured in that a magnified image or a reduced image can be obtained with no aberration. A microscope capable of television observation, a digital camera, a television camera or the like can be obtained.

In addition, when a light source such as a lamp or an LED is placed at a position $P_1$, an illumination optical system for focusing light at a position $P_2$ can be obtained. The system can be used for a light source for a microscope, an endoscope or the like.

Further, in the example shown in FIG. 1, a photo mask is placed at $P_2$, a wafer is placed at $P_1$, and then, illumination light is emitted from the right side, so that a stepper (projection exposure device) for use in manufacture of an LSI or the like can be obtained. A stepper optical system is also called a lithography optical system.

Figure 3:
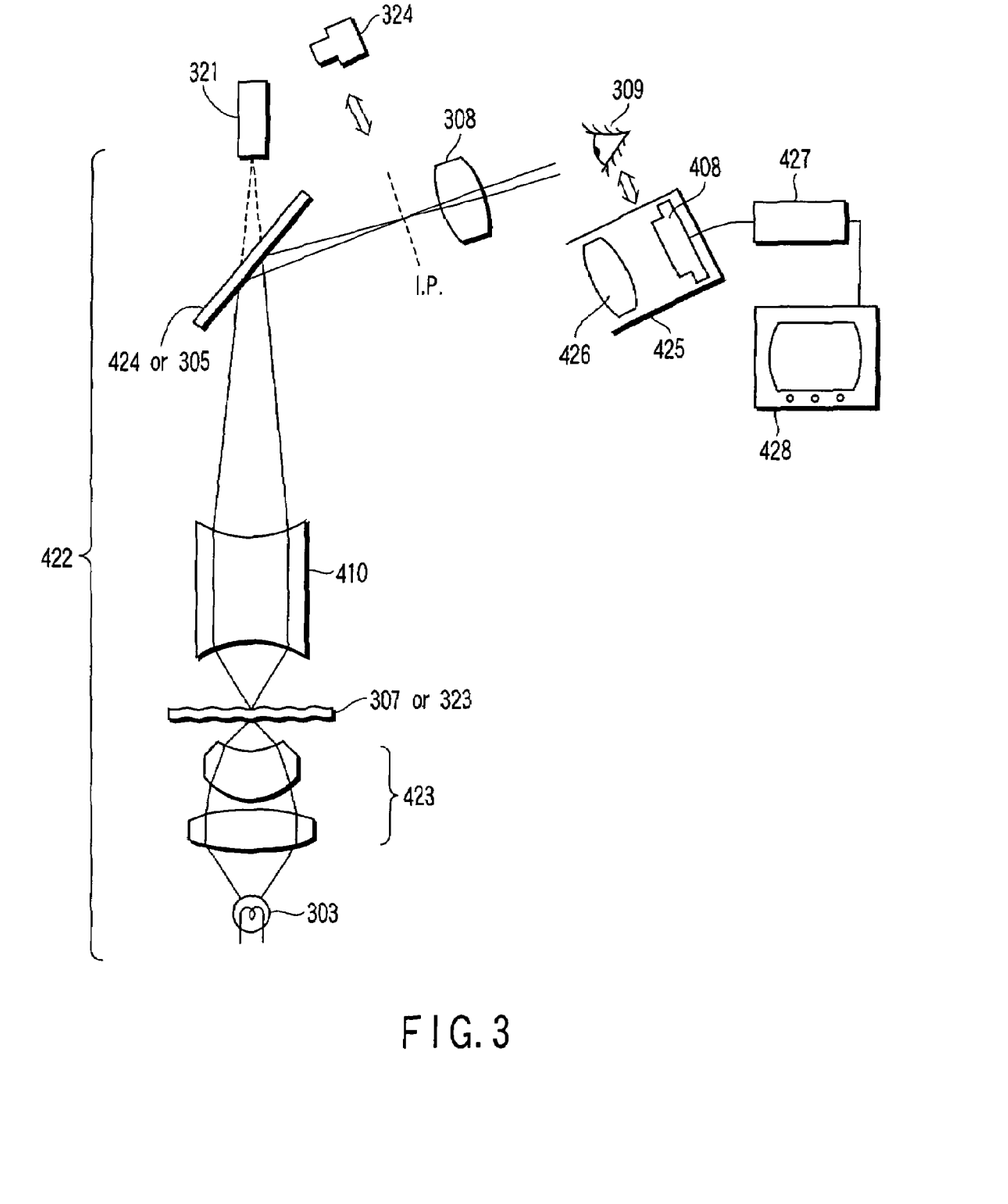
FIG. 3 is a view for explaining a second embodiment of the present invention.

FIG. 3 is a view for explaining a second embodiment of the present invention, and shows a microscope 422 using a lens 410. The light beams emitted from a light source 303 are focused by an illumination lens 423, and illuminate a sample 307. The light beams scattered from the sample 307 are formed as an image by the lens 410 having a function as an objective lens, an optical path thereof is bent on a mirror 424, and an actual image is produced on an I.P. The sample 307 corresponds to $P_1$, and the I.P. corresponds to $P_2$. Then, the image is magnified by an ocular lens 308, and a magnified image can be seen by an eye 309.

Alternatively, a magnified image can be picked up by a television camera 425 provided rearward of the ocular lens 308. Here, reference numeral 426 denotes an image pickup lens, 408 denotes a solid state image pickup element, 427 denotes an electronic circuit, and 428 denotes a display device.

The ocular lens 308 and the image pickup lens 426 are made of a medium having a positive refractive index, such as a glass or a plastic.

The microscope 422 is placed in air of 1 atmosphere, and the settings are provided as follows:

$$n_s = -1.0003$$

$$n_0 = 1.0003$$

$$\lambda = 500 \text{ nm}$$

$$|\beta| = 20$$

In an optical system shown in FIG. 3, an optical disk 323 is arranged instead of the sample 307, a translucent mirror 305 is arranged instead of the mirror 424, a photo detector 324 is arranged at a position of IP, and further, a light source such as a semiconductor laser is arranged at a position of the light source 321, whereby an optical disk or an optical device can be obtained. This device is featured in that large NA can be obtained with no aberration.

Figure 4:
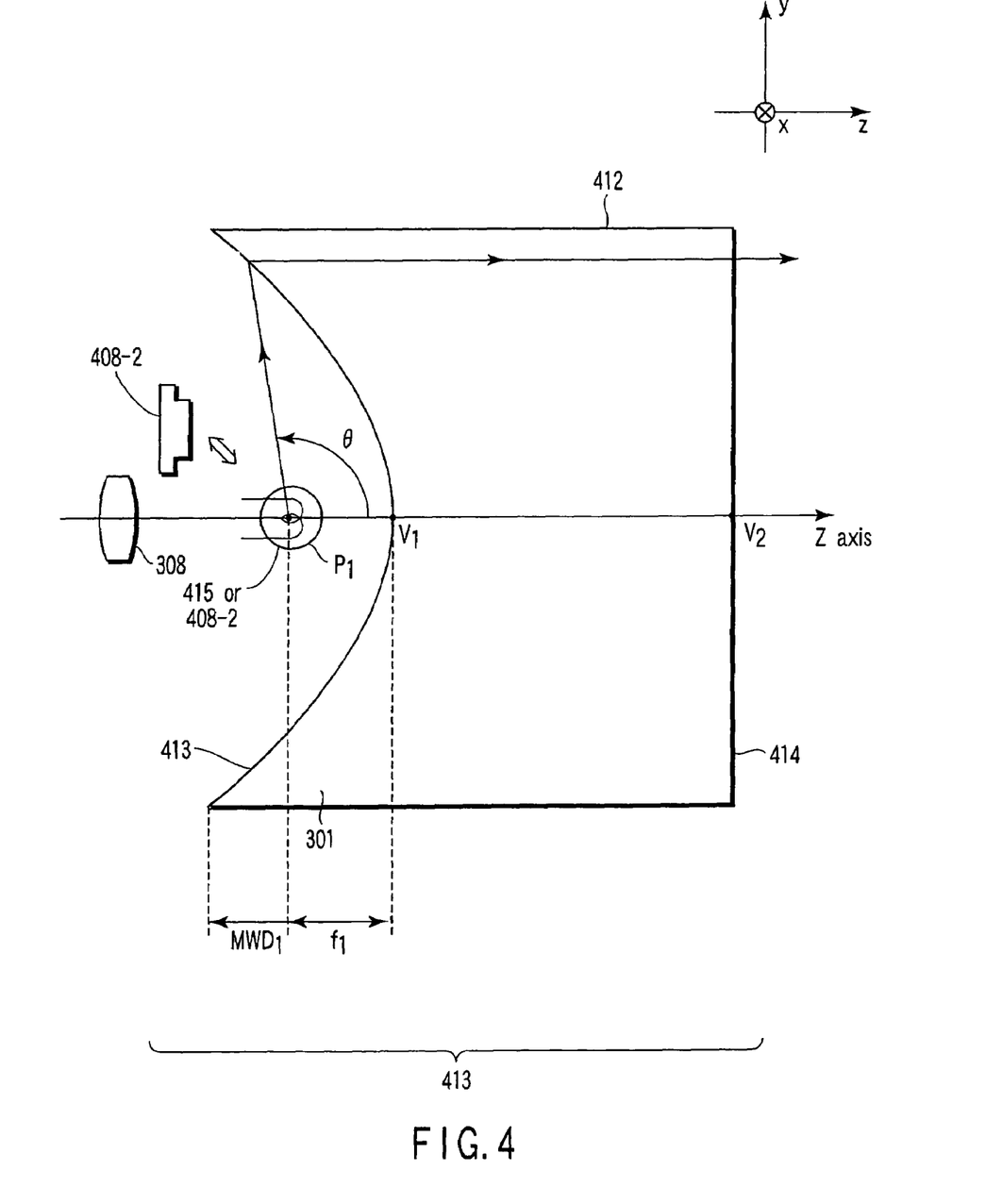
FIG. 4 is a view for explaining a third embodiment of the present invention.

FIG. 4 is a view for explaining a third embodiment of the present invention. In the figure, an illumination optical system 413 uses a lens 412 formed of a negative refractive index medium 301. A left side face 413 of the lens 412 is provided as a rotational paraboloid, and a right side face 414 of the lens 412 is provided as a flat surface. An axis of the illumination optical system 413 is provided as a Z axis.

A light source 415 is arranged at a focal point $P_1$ of the illumination optical system 413, and the light beams emitted from the light source 415 are refracted by the illumination optical system 413, and are emitted as light beams parallel to the Z axis. In this optical system, a magnification β is infinitely large. Then, image formation with no aberration can be carried out in an infinitely telescopic manner.

As compared with a conventional illumination system using a reflection cover, a light source itself does not block an optical path, and an efficient illumination optical system can be achieved.

It is easy to set NA at the light incident side to be 1 or more, namely, θ≧90°. The shape of the surface 414 may be a curved surface, a fresnel surface or the like. Examples of light sources include a halogen lamp, a xenon lamp, an LED, a semiconductor laser, an emission end of an optical fiber, an optical waveguide, and a super-luminescent diode. In an example of the illumination optical system 413, the periphery of the lens 412 is air, and $n_s=-1.0003$, $n_0=1.003$, θ=110°, $P_1=10$ mm, and λ (wavelength) ranges from 350 to 700 nm.

The shape of the illumination optical system 413 may be approximated on a spherical surface. In that case, assuming that the curvature radius is $R_1$, the following formula is established:

$$f_1 = \left|\frac{R_1}{2}\right|$$  Formula 170

In the case of two dimensions, the shape of the illumination optical system 413 becomes a parabola or a circle.

In an example shown in FIG. 4, Formula 164 may be satisfied. An illumination system shown in FIG. 4 can be used, for example, for the purpose of display by combining it with an LED, and a search light, a light source of a microscope, a light source of an endoscope, a light source of optical communication, and a light source of an optical disk by combining it with a lamp.

In the case where a distance by which light emission is attempted by the illumination optical system is a finite distance, the shape of the illumination optical system 413 may be a rotational hyperboloid or a hyperbolic curve (in the case of two-dimension) with the Z axis being a long axis. In this case as well, the position of the light source is a focal point of one of a hyperboloid and a hyperbolic curve. A lens made of a negative refractive index medium having a hyperboloid will be described later with reference to FIG. 5.

In the optical system shown in FIG. 4, conversely, light beams are incident from the right side, and an image pickup element 408-2 is arranged at a position of $P_1$, whereby an image pickup device with no aberration can be obtained. An image pickup device having a large numerical aperture at the emission side and sufficient brightness can be obtained.

This device can be used for a digital camera, a television camera or the like. Alternatively, in the optical system shown in FIG. 4, the light source is removed from the position of $P_1$, an ocular lens 308 is placed at the left side of $P_1$, and light beams are incident from the right side, so that a telescope can be obtained. Formula 164, Formula 165, Formula 169, and Formula 169-2 may be applied to the system shown in FIG. 4. Depending on usage, the shape of the surface 414 may be a curved surface.

Figure 5:
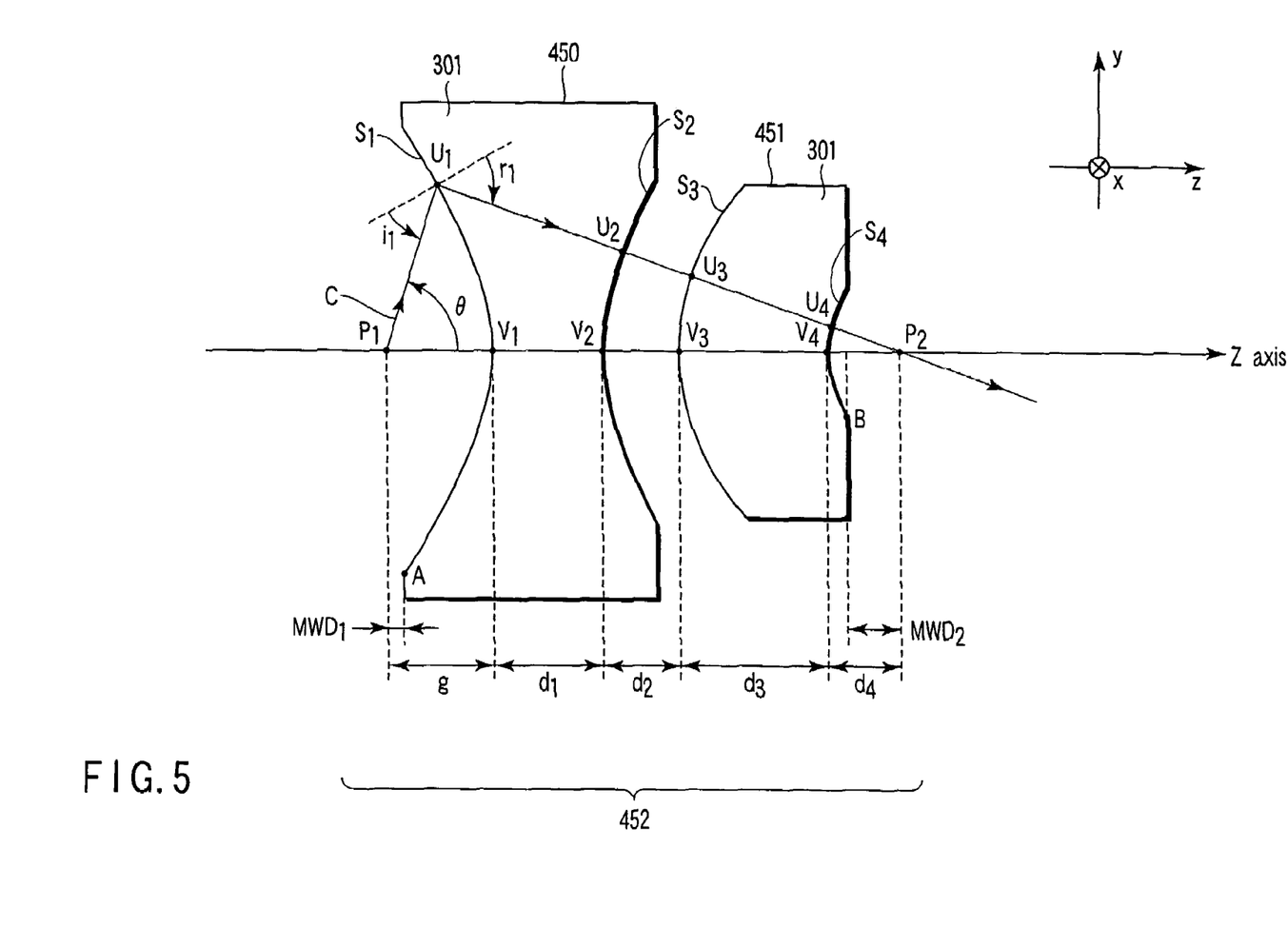
FIG. 5 is a view for explaining a fourth embodiment of the present invention.

FIG. 5 is a view for explaining a fourth embodiment of the present invention. In the figure, an optical system 452 includes a lens 450 having a rotational hyperboloid $S_1$ made of a negative refractive index medium 301. A lens 451 has a spherical surface made of the negative refractive index medium 301.

$P_1$ and $P_2$ denote as focal points of the rotational hyperboloid (hyperbolic curve in the case of two dimensions). A rotation axis (in the case of two dimensions, an axis) of $S_1$ is a X axis. $S_1$ denote a left side face of the lens 450, $S_2$ denotes a right side face of the lens 450, $S_3$ denotes a left side face of the lens 451, and $S_4$ denotes a right side face of the lens 451.

$V_i$ (i=1, 2, 3, 4) denotes a cross point between $S_1$ and the Z axis. $U_1$ denotes a cross point between a light beam C emitted from $P_1$ and $S_1$. $S_2$, $S_3$, and $S_4$ denote a spherical surface (circle in the case of two dimensions) with $P_2$ being a spherical center, and its radius is defined as $R_i$. In this case, the following formula is established:

$R_i>0$ (i=2, 3, 4)  Formula 180

$d_i$ denotes a distance between $V_i$ and $V_{i+1}$, $d_4$ denotes a distance between $V_4$ an $P_2$. g denotes a distance between $P_1$ and $V_1$.

Here, $d_1$ and $d_3$ are selected so as to satisfy the following formulas:

$$d_1 = g$$  Formula 181

$$d_3 = d_2 + d_4 = 1/2(P_1P_2 - 2g)$$  Formula 182

A refractive index of the lens 450 with respect to a vacuum is defined as $n_s$, a refractive index of the lens 451 with respect to a vacuum is defined as $n_2$, and a refractive index of the periphery of the lenses 450 and 451 is defined as $n_0$.

$n_s$ and $n_2$ are selected so as to satisfy the following formulas:

$$n_s = -n_0$$  Formula 184

$$n_2 = -n_0$$

Therefore, the following formula is established:

$n_2=n_s$  Formula 185

Definitions of $i_1$ and $r_1$ are an incident angle and a refraction angle at $U_1$, respectively.

From Formula 181, the following formula is obtained:

$R_2=P_1P_2-2g$  Formula 185-2

Assume that $S_2$, $S_3$, and $S_4$ are not present. $r_1=-i_1$ is established in accordance with the refraction law, and C passes through $P_2$ independent of θ in accordance with geometrical property of the rotational hyperboloid and hyperbolic curve.

Even if $S_2$, $S_3$, and $S_4$ are present, these surfaces are concentric surfaces with $P_2$ being a spherical center, and thus, $U_2$, $U_3$, and $U_4$ are orthogonal to the respective surfaces, no refraction occurs, and C passes through $P_2$. For this reason, whatever the lens 451 is present or absent, the light beams emitted from $P_1$ by means of the lens 450 is formed as an image at $P_2$ with no aberration. Therefore, the emitted light components of the light beams emitted from $P_1$ get together at $P_2$. In other words, an actual image of $P_1$ is formed at $P_2$. At this time, a magnification $\beta$ is given by the following formula:

$$\beta = -\frac{g}{P_1P_2 - g}$$

Next, let us consider an optical path length of light beams emitted from $P_1$. In addition, let us consider a case in which the lens 451 is present. By definitions of rotational hyperboloids (hyperbolic curves in two dimensions), the following formula is established:

$P_1U_1 = U_1U_2$            Formula 186

In addition, the following formula is also established:

$$U_3U_4 = U_2U_3 + U_4P_2$$
$$= d_3$$
$$= d_2 + d_4$$

Formula 187

Thus, the optical path length in a positive refractive index medium of the light beam C is equal to that in a negative refractive index medium. In practice, instead of Formula 181, the following formula may be established:

$0.7g \leq d_1 \leq 1.4g$            Formula 181-2

Depending on usage, the following formula is also allowed:

$0.3g \leq d_1 \leq 2.5g$            Formula 181-3

In practice, instead of Formula 185-2, the following formula may be established:

$0.7(P_1P_2 - 2g) \leq R_2 \leq 1.5(P_1P_2 - 2g)$      Formula 185-2-1

Depending on usage, the following formula is also allowed:

$0.3(P_1P_2 - 2g) \leq R_2 \leq 3(P_1P_2 - 2g)$      Formula 185-2-2

In practice, instead of Formula 182, the following formula may be established:

$0.35(P_1P_2 - 2g) \leq d_3 \leq 0.8(P_1P_2 - 2g)$      Formula 182-2

Depending on usage, the following formula is also allowed:

$0.15(P_1P_2 - 2g) \leq d_3 \leq 1.6(P_1P_2 - 2g)$      Formula 182-3

In addition, the lens 451 may be divided into a plurality of concentric spherical surfaces. Further, a sum of their thickness may be equal to the following formula:

$$\frac{1}{2}(P_1P_2 - 2g)$$

As a special case, $d_2 = 0$ may be defined, and $d_3 = d_4$ may be defined. Namely, the lens 450 and the lens 451 are integrated with each other. At this time, the following formula is established:

$V_1V_4 = \frac{1}{2}P_1P_2$            Formula 188

In this case, $V_1V_4$ represents a thickness of the lens 450. In practice, the following formula may be established:

$0.35P_1P_2 \leq V_1V_4 \leq 0.8P_1P_2$      Formula 188-2

Depending on usage, the following formula may be established:

$0.15P_1P_2 \leq V_1V_4 \leq 1.5P_1P_2$      Formula 188-3

The usage of the optical system shown in FIG. 5 is identical to those of the examples shown in 1 to 4.

In addition, an object is placed at $P_2$ so that an image may be formed at $P_1$.

The surface $S_1$ may be approximated on a spherical surface of a radius of $-2g$.

Formula 163-2, Formula 163-3, Formula 163-4, Formula 163-5, Formula 163-6, Formula 164, Formula 165, Formula 164-2, and Formula 165-2 can be applied to the example shown in FIG. 5.

Formula 169 and Formula 169-2 can be applied for the lens 450, and can also be applied for the lens 451 if $n_s$ is replaced with $n_2$.

Formula 173 and Formula 174 described later can be applied if $f_1$ is replaced with $g$.

In an embodiment shown in FIG. 5, the following settings are provided:

$$g = 100 \text{ μm (micrometers)}$$
$$P_1P_2 = 500 \text{ μm}$$
$$d_2 = 30 \text{ μm}$$
$$d_3 = 150 \text{ μm}$$
$$d_4 = 120 \text{ μm}$$
$$R_2 = 300 \text{ μm}$$
$$\theta = 80°$$
$$n_s = -1.00028$$
$$n_2 = -1.00028$$
$$n_0 = 1.00028$$
$$\lambda = 1.5 \text{ μm}$$

The optical system shown in FIG. 5 can be used for an optical pickup, an optical LSI, a microscope, a lithography optical system, and the like.

A description will be given with respect to an allowable value $\Delta$ of a deviation in the Z direction from $P_1$, of an object point or an object, or alternatively, a light source.

It is sufficient to establish the following formula for the purpose of utilizing a general optical device:

$\Delta \leq \frac{f_1}{7}$            Formula 173

Depending on usage, the following formula can also be allowed:

$\Delta \leq \frac{f_1}{3}$            Formula 174

In the case of a rotational hyperboloid or hyperbolic curve, it is assumed that $f_1$ is replaced with g.

A refractive index may be inverted in the system shown in FIG. 5. Namely, a left side space from $S_1$, a space between $S_2$ and $S_3$, and a right side space from $S_4$ may be filled with a negative refractive index medium, and a space between $S_1$ and $S_2$ and a space between $S_3$ and $S_4$ may be filled with a positive refractive index medium. As long as Formula 104 is satisfied, image formation with no aberration is achieved.

Further, a space being at the right side from a flat surface passing through $P_1$ and vertical to the Z axis, and being at the left side from $S_1$, may be filled with a negative refractive index, and may be used as one lens. At this time, the space at the right side of $S_1$ and at the left side of $S_2$ is defined as a positive refractive index medium. As long as Formula 104 is satisfied, image formation with no aberration is achieved.

Figure 6:
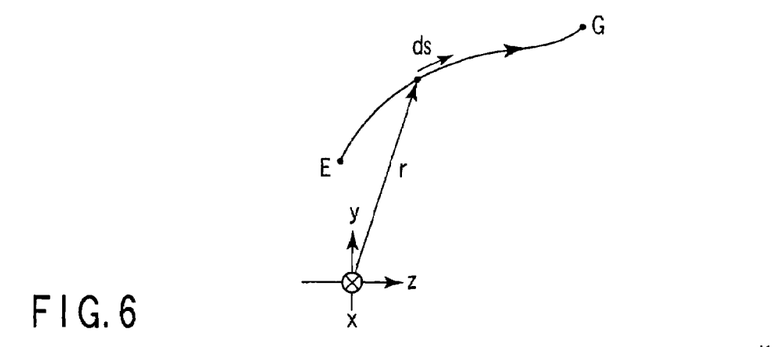
FIG. 6 is a view for explaining an emitted light component at the time when a light beam emitted from an object point E is formed as an image at an image point G.

Referring now to FIG. 6, when the light beams emitted from an object point E are generally formed as an image at an image point G, it is necessary to establish the following formula with respect to the emitted light components:

$$\delta \int_E^G n(r)ds = 0 \quad d \qquad \text{Formula 200}$$

This is a Felmat's minimum time theory. In Formula 200, n(r) represents a refractive index in a positional vector r on an optical path.

"ds" represents a line element along an optical path.

Assuming that the following formula is established:

$$r = \begin{pmatrix} x \\ y \\ z \end{pmatrix} \qquad \text{Formula 201}$$

the following formula is also established:

$$ds = \sqrt{(dx)^2 + (dy)^2 + (dz)^2} \qquad \text{Formula 202}$$

δ preceding an integral symbol represents a variation of an optical path. On the other hand, with respect to evanescent wave components, it is desirable to establish the following formula relevant to the light beams emitted in a vertical direction of an object surface:

$$\int_E^G n(r)ds = 0 \qquad \text{Formula 203}$$

This formula is satisfied on the Z axis in the examples shown in FIGS. 1, 5 and 10. In order to establish Formula 203, it is necessary that both of a negative refractive index medium and a positive refractive index medium exist on an optical path.

In practice, instead of Formula 200, the following formula may be established:

$$-10\lambda \leq \delta \int_E^G n(r)ds \leq 10\lambda \qquad \text{Formula 202-2}$$

Depending on usage, the following formula is also allowed:

$$-30\lambda \leq \delta \int_E^G n(r)ds \leq 30\lambda \qquad \text{Formula 200-3}$$

Similarly, instead of Formula 203, the following formula may be established:

$$-10\lambda \leq \int_E^G n(r)ds \leq 10\lambda \qquad \text{Formula 203-2}$$

Depending on usage, the following formula is also allowed:

$$-30\lambda \leq \int_E^G n(r)ds \leq 30\lambda \qquad \text{Formula 203-3}$$

In the formula, λ denotes a wavelength of a light beam to be used.

Figure 7:
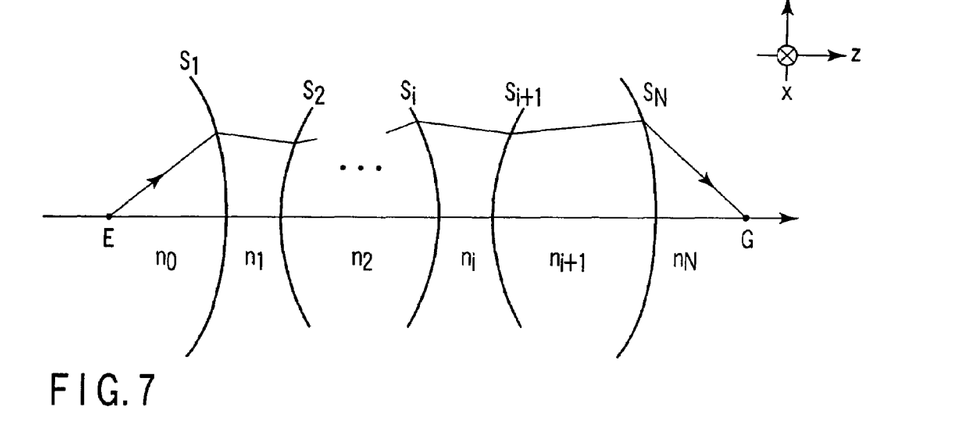
FIG. 7 is a view showing an optical system composed of N faces.

As shown in FIG. 7, let us consider an optical system composed of N faces. $n_1$ denotes a refractive index of a medium between an i face and an i+1 face. "i" denotes an integer from 0 to N. In order to establish better image formation in such an optical system, it is desirable that Formula 200 and Formula 203 are established.

It is advantageous to provide an optical system including three or more curved surfaces because aberration can be easily eliminated.

Further, it is advantageous to form a non-spherical surface in order to correct for aberrations. With respect to an image forming relationship, it is good to provide an optical system that does not relay an image because aberration is improved. The term "relay" used here denotes that once formed image is further formed as an image, and an optical system shown in FIG. 10 falls under this relay system. It is desirable that "$n_i$" includes a value equal to a value whose sign is reversed and whose absolute value is equal thereto. For example, $n_0=1$, $n_1=-1$, $n_2=2$, $n_3=-2$ or the like is desirable. Although this is commonly true for the present application, a medium having a uniform refractive index should be used as a negative refractive index substance because it is easily fabricated.

Formulas 200-2, 200-3, 203-2, and 203-3 are applied similarly to an example shown in FIG. 7 as well.

In the case where a circle, a parabola, a hyperbolic curve, and an ellipse are described in the present application, these shapes are assumed to include a cylindrical surface, a cylindrical paraboloid, a cylindrical hyperboloid, and a cylindrical elliptical surface as well. In addition, in the present application, a sign of a radius of a spherical surface or a circle is assumed to be positive in the case where the surface is formed in a convex shape on the left. Namely, the sign is assumed to be positive in the case where the surface is formed in a convex shape in the −Z axis direction.

A rotational paraboloid, a rotational hyperboloid, a rotational elliptical surface, a cylindrical paraboloid, a cylindrical hyperboloid and a cylindrical elliptical surface each are provided as an example of a smooth non-spherical surface.

A parabola, a hyperbolic curve, and an ellipse each are provided as a smooth curve that is not a circle.

A two-dimensional optical system or optical element according to the present invention may be used for an optical signal processor system such as an optical circuit, an optical IC, or an optical LSI.

In the case where the term "light beam" is used in the present invention, the term is assumed to include an electromagnetic wave having an arbitrary number of vibrations. In addition, when a wavelength is defined as λ, there is attained a practical merit in using an electromagnetic wave given by the following formula:

$$100\ nm \leq \lambda \leq 20\ cm \qquad \text{Formula 280}$$

The electromagnetic wave may be used for a ultraviolet-ray, a visible light beam, a near-infrared ray, an infrared ray, a far-infrared ray, a Terra-Herz wave, a microwave or the like. In order to mitigate an effect of color aberration that a negative refractive index medium has, a light beam having a single wavelength or a light beam having a narrow wavelength region (for example, having a width of 100 nm or less) may be used.

Figure 8:
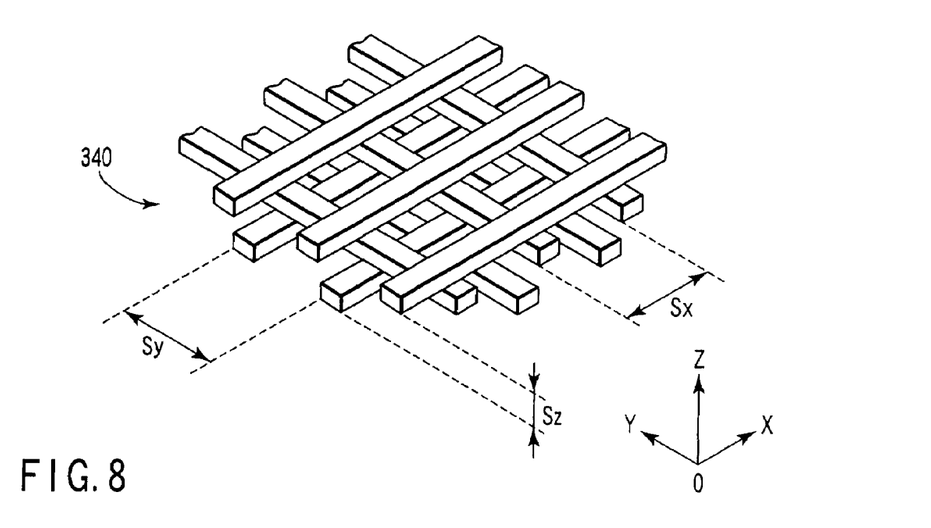
FIG. 8 is a view showing a first specific example of a photonic crystal 340.
Figure 9:
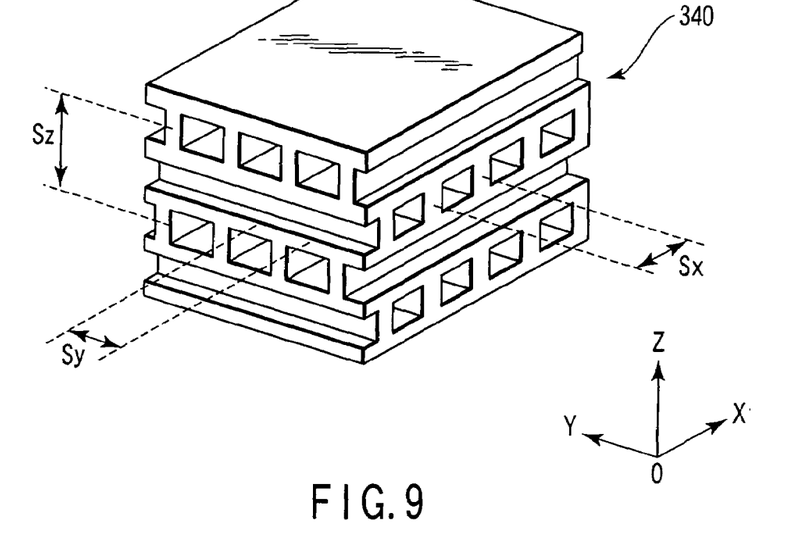
FIG. 9 is a view showing a second specific example of the photonic crystal 340.

Now, the contents common to the present invention will be described here. A photonic crystal can be exemplified as a specific substance of a negative refractive index medium 301. FIG. 8 shows a first specific example of a photonic crystal 340, and FIG. 9 shows a second specific example of the photonic crystal 340. As shown in FIGS. 8 and 9, the photonic crystal 340 is provided as a substance having a cyclic structure in order of λ to 1λ/n, and is produced in accordance with lithography or the like. The materials include: dielectrics such as synthetic resins such as $SiO_2$, acryl, and polycarbonate, and GaAs. Here, λ denotes a wavelength of a light beam to be used. Values of repetition cycles Sx, Sy, and Sz in the X, Y, and Z directions in the figure each have a value in order of λ to 1λ/n. It is known that a negative refractive index can be achieved in the vicinity of a band end of the photonic crystal (refer to non-patent document 3). The z direction in the figure may be an optical axis of an optical system.

The Z axis denotes a direction of an axis that is the next in rotational symmetry of a photonic crystal.

It is desirable that Sx, Sy, and Sz satisfy any of the following formulas:

$$\lambda/10 < Sx < \lambda \qquad \text{Formula (5-1)}$$

$$\lambda/10 < Sy < \lambda \qquad \text{Formula (5-2)}$$

$$\lambda/10 < Sz < \lambda \qquad \text{Formula (5-3)}$$

If the values of Sx, Sy, and Sz each exceed the upper limit or are lower than the lower limit, the photonic crystal does not function.

Depending on usage, it suffices that any of the following formulas may be satisfied:

$$\lambda/30 < Sx < 4\lambda \qquad \text{Formula (5-4)}$$

$$\lambda/30 < Sy < 4\lambda \qquad \text{Formula (5-5)}$$

$$\lambda/30 < Sz < 4\lambda \qquad \text{Formula (5-6)}$$

It is known that, with respect to a negative refractive index medium, a refractive index of the medium is obtained as follows when a specific dielectric ε of the medium is negative and a specific permeability μ of a medium is negative:

$$-\sqrt{\epsilon\mu}$$

Usable examples of a negative refractive index medium include: a substance indicating negative refraction; a substance indicating approximately negative refraction, such as a thin film made of silver, gold, or copper; a substance indicating a negative refractive index with respect to a specific polarizing direction; and a thin film made of a substance whose dielectric ε is substantially −1.

A negative refractive index medium may be called a Left handed material. In the present invention, all the negative refractive index mediums, left handed materials, substances indicating approximately negative refraction, substances indicating a negative refractive index with respect to a specific polarizing direction, and a thin film of a substance whose dielectric ε is substantially −1 or the like are called substances indicating negative refraction. A substance indicating complete image formation is also included in a medium indicating negative refraction. In addition, in the case of a thin film made of a substance whose dielectric ε is substantially −1, the following formula may be satisfied:

$$-1.2 < \epsilon < -0.8 \qquad \text{Formula (5-7)}$$

Depending on usage, the following formula may be established:

$$-1.6 < \epsilon < -0.5 \qquad \text{Formula (5-8)}$$

While the embodiment has described that an example in which a single-color light beam is mainly used as a wavelength of a light beam to be used, a light source of continuous spectra, a white light source, a sum of a plurality of single color light beams, or a low coherent light source such as a super-luminescent diode may be used without being limited thereto.

A wavelength of 0.1 μm to 3 μm may be used because it can be transmitted even in air and a light source can be easily obtained. A visible wavelength is further desirable because it is available more easily. It is still further desirable to define a wavelength of 0.6 μm or less because image resolution is improved.

It is yet further desirable to define to 20 m or less a length measured along an optical axis of an optical system including a negative refractive index medium because an optical system and an optical device are easily fabricated.

In an example shown in the embodiment of FIG. 1 of the present application, a distance between an object point (such as $P_1$) or an image point (such as $P_2$) relevant to an image forming optical system (such as 410) and the image forming optical system is featured to be finite. Further, even if the object point and the image point are replaced with each other, an image forming relationship is satisfied. Such an optical system is also included in the present application.

Moreover, while the present application has used a term "complete image formation", this term is assumed to include a case in which 100% complete image formation is not carried out, for example, a case in which 50% image resolution is improved. Namely, for example, this term is assumed to include a case in which image resolution is improved to some extent more remarkably than a normal refraction limit.

According to the present invention, there is provided an optical system capable of producing a magnified image or a reduced image of an object by using a negative refractive index medium.

Lastly, a description will be given with respect to definitions of technical terms used in the present embodiment.

An optical device denotes a device including an optical system or an optical element. The device may not function as an optical device solely. Namely, the device may be part of another device.

An optical device includes an image pickup device, an observation device, a display device, an illumination device, a signal processor device, an optical information processing unit, a projector device, a projection exposure device and the like.

Examples of the image pickup device include a film camera, a digital camera, a PDA digital camera, a robot's eye, a lens exchange type digital single-lens reflex camera, a television camera, a mobile image recording device, an electronic mobile image recording device, a cam coder, a VTR camera, a digital camera of a portable cellular phone, a television camera of a portable cellular phone, an electronic endoscope, a capsule endoscope, a car-mounted camera, a camera of an artificial satellite, a camera of a planetary probe, a camera of a astronomic probe, a camera of a monitor device, eyes of various sensors, a digital camera of a recording device, an artificial sight, a laser scanning type microscope, a projection exposure device, a stepper, an aligner, and an optical probe type microscope. Examples of electronic image pickup devices include a digital camera, a card type digital camera, a television camera, a VTR camera, a mobile image recorder camera, a digital camera of a portable cellular phone, a television camera of a portable cellular phone, a car-mounted camera, a camera of an artificial satellite, a camera of a planetary probe, a camera of an astronomic probe, and a digital camera of a recording device.

Examples of the observation device include a microscope, a telescope, a glass, a binocular glass, a loupe, a fiber scope, a finder, a view finder, a contact lens, an intraocular lens, and an artificial sight.

Examples of the display device include a liquid crystal display, a view finder, a game machine (PlayStation available from Sony Corporation.), a video projector, a liquid crystal projector, a head mounted display (HMD), a personal digital assistant (PDA), a portable cellular phone, and an artificial sight.

A video projector, a liquid crystal projector and the like can be used as a projector device.

Examples of the illumination device include a camera strobe, an automobile headlight, an endoscopic light source, and a microscopic light source.

Examples of the signal processor device include: a portable cellular phone, a personal computer, a game machine, an optical disk read/write device, an optical calculator computing device, an optical interconnection device, an optical information processing unit, an optical LSI, an optical computer, and a PDA.

An information transmitter device designates a portable cellular phone, a fixed type telephone, a game machine, remote controllers of a television, a radio cassette, a stereo and the like; and devices capable of inputting and transmitting any kind of information contained in a personal computer, a keyboard, a mouse, a touch panel, etc. of a personal computer.

This transmitter device also includes a television monitor, a personal computer monitor, and a display with an image pickup device.

The information transmitter device is included in the signal processor device.

An image pickup element designates, for example, a CCD, an image pickup tube, a solid state image pickup element, a photographic film or the like. In addition, a parallel planer plate is assumed to be included in one of prisms. A change in degree of vision is assumed to be included in an observer's change. Object changes are assumed to include a change in distance relevant to an object, an object movement, an object motion, a vibration, an object blurring and the like. An image pickup element, a wafer, an optical disk, a silver salt film and the like are examples of image formation members.

Definitions of extended curved surfaces are as follows.

In addition to a spherical surface, a flat surface, and a rotational symmetrical non-spherical surface, there may be any shape of a spherical surface that is eccentrically deformed with respect to an optical axis, a flat surface, a rotational symmetrical non-spherical surface, or alternatively, a non-spherical surface having symmetrical surfaces, a non-spherical surface having only one symmetrical surface, a non-spherical surface free of a symmetrical surface, a free curved surface, a surface having a point and a line that cannot be differentiated. A reflection surface or a refraction surface may be used as long as it has any effect on a light beam.

In the present invention, these elements are generally called an extended curved surface.

An optical system includes an optical system and an image forming optical system or the like.

An image forming optical system designates an image pickup optical system, an observation optical system, a projection optical system, a projection and exposure optical system, a display optical system, a signal processing optical system or the like.

Examples of the image pickup optical system include an image pickup lens of a digital camera.

Examples of the observation optical system include a microscopic optical system and a telescopic optical system.

Examples of the projection optical system include a video projector optical system, a lithography optical system, an optical system for reading out or writing an optical disk, and an optical system of an optical pickup.

Examples of the projection and exposure optical system include a lithography optical system.

Examples of the display optical system include an optical system of a view finder of a video camera.

Examples of the signal processing optical system include an optical system for reading out and writing an optical disk, and an optical system of an optical pickup.

Examples of the signal processing optical system include.

Examples of the illumination optical system include optical systems used for a microscope, an endoscope, an optical pickup, a searchlight, and a lighthouse. Additional examples of the illumination optical system include a focusing lens system for a light emitting diode, a light source optical system for optical communication, and an optical system for optical LSI or the like.

Optical elements designate a lens, a non-spherical surface lens, a mirror, a prism, a free curved surface prism, a diffraction optical element (DOE), a non-uniform lens or the like. A parallel flat plate is included in one of the optical elements.

What is claimed is:

1. A lens formed of a medium indicating negative refraction, having a convex or concave shaped smooth non-spherical surface or a non-circle curve.

2. A lens having two optical surfaces formed of a medium indicating negative refraction, one of which is a rotational paraboloid, a rotational hyperboloid, a parabola, or a hyperbolic curve.

3. A lens having two optical surfaces formed of a medium indicating negative refraction, one of which is a concave shaped rotational paraboloid or rotational hyperboloid, or alternatively a parabola or hyperbolic curve.

4. A lens formed of a medium indicating negative refraction, having a double concave shape, each of the double concave shape constituting a rotational paraboloid, the two rotational paraboloids sharing a common axis whose convex surfaces are opposed to each other.

5. A lens according to claim 4, wherein, when respective focal distances of the rotational paraboloid is defined as $f_1$ and $f_2$, a gap between the two surfaces satisfies the following formula $$0.5(f_1+f_2)<d<2(f_1+f_2)$$

wherein $f_1$ is defined as a distance between $P_1$ and $V_1$, and $f_2$ is defined as a distance between $P_2$ and $V_2$, wherein $P_1$ is a focal point of a paraboloid of the curved surface S1 and $P_2$ is a focal point of a paraboloid of the curved surface $S_2$, and $V_1$ is a cross point between the Z axis and the curved surface $S_1$, and $V_2$ is a cross point between the Z axis and the curved surface $S_2$.

6. A lens according to claim 5, wherein a parabolic curve is used instead of the rotational paraboloid.

7. A lens having a double concave shape formed of a medium indicating negative refraction and having two spherical surfaces whose concave surfaces are opposite to each other, wherein, when respective curvature radiuses of the spherical surfaces are $R_1$ and $R_2$, a gap between the two surfaces satisfies the following formula $$0.5(f_1+f_2)<d<2(f_1+f_2)$$

wherein $f_1$ is defined as a distance between $P_1$ and $V_1$, and $f_2$ is defined as a distance between $P_2$ and $V_2$, wherein $P_1$ is a focal point of a paraboloid of the curved surface $S_1$ and $P_2$ is a focal point of a paraboloid of the curved surface $S_2$, and $V_1$ is a cross point between the Z axis and the curved surface $S_1$, and $V_2$ is a cross point between the Z axis and the curved surface $S_2$.

8. A lens according to claim 7, wherein a circle is used instead of the spherical surface.

9. A lens formed of a medium indicating negative refraction, the lens having a double concave shape, wherein a rotational hyperboloid and a spherical surface are arranged such that respective convex surfaces thereof are opposed to each other.

10. A lens according to claim 9, wherein a spherical center of the spherical surface is present on a rotary axis of the rotational hyperboloid.

11. A lens according to claim 9, wherein the lens satisfies either one of the following formulas $$0.15P_1P_2 \leq V_1V_4 \leq 1.5P_1P_2$$

and $$0.3g \leq S\,d_1 \leq 5\,2.5g$$

wherein $P_1$ is a focal point of a paraboloid of the curved surface $S_1$ and $P_2$ is a focal point of a paraboloid of the curved surface $S_2$, and $V_1$ is a cross point between the Z axis and the curved surface $S_1$, and $V_4$ is a cross point between the Z axis and the curved surface $S_4$, and $g$ denotes a distance between $P_1$ and $V_1$, and $d_1$ denotes a distance between $V_1$ and $V_2$.

12. A lens according to claim 9, wherein the lens satisfies the following formula $$0.3(P_1P_2-2g) \leq R_2 \leq 3(P_1P_2-2g)$$

wherein $P_1$ is a focal point of a paraboloid of the curved surface $S_1$ and $P_2$ is a focal point of a paraboloid of the curved surface $S_2$, and $V_1$ is a cross point between the Z axis and the curved surface $S_1$, and $g$ denotes a distance between $P_1$ and $V_1$, and $R_2$ is a curvature radius of the curved surface $S_2$.

13. A lens according to claim 9, wherein a hyperbolic curve is used instead of a rotational hyperboloid, and wherein a circle is used instead of a spherical surface.

14. A lens according to claim 9, wherein an approximate spherical surface or an approximate circle is used instead of a rotational hyperboloid or a hyperbolic curve.

15. A lens according to claim 9, wherein the lens satisfies the following formula $$0.5 < \left|\frac{n_s}{n_0}\right| < 1.6$$

wherein $n_s$ denotes a refractive index of the negative refractive index medium with respect to a vacuum, and $n_0$ denotes a refractive index of the periphery of the negative refractive index medium with respect to a vacuum.

16. An optical system, wherein when the lens according to claim 9 is a first lens, in addition to the first lens, there is provided a second lens having two concentric spherical surface formed of a medium indicating negative refraction, and wherein a spherical center of the first lens according to claim 9 substantially coincides with a spherical center of the second lens.

17. An optical system according to claim 16, wherein thickness of the second lens satisfies the following formula $$0.3(P_1P_2-2g) \leq R_2 \leq 3(P_1P_2-2g)$$

wherein $P_1$ is a focal point of a paraboloid of the curved surface $S_1$ and $P_2$ is a focal point of a paraboloid of the curved surface $S_2$, and $V_1$ is a cross point between the Z axis and the curved surface $S_1$, and $g$ denotes a distance between $P_1$ and $V_1$, and $R_2$ is a curvature radius of the curved surface $S_2$.

18. An optical system having the lens according to claim 9 and an optical element made of a positive refractive index medium.

19. An illumination optical system, having the lens according to claim 2, wherein a light source is provided in the vicinity of a focal point of the rotational paraboloid or a parabola.

20. An illumination optical system according to claim 19, wherein the rotational paraboloid or parabola is approximated by a spherical surface or a circle.

21. An optical system comprising the lens according to claim 9, wherein an object or a light source is arranged in the vicinity of a focal point of the rotational paraboloid or parabola, rotational hyperboloid or hyperbolic curve, or alternatively, spherical surface or circle.

22. An optical system comprising the lens according to claim 9, wherein an object or a light source is arranged at a position meeting the following formula $$\Delta \leq \frac{f_1}{3}$$

wherein $f_1$ is defined as a distance between $P_1$ and $V_1$, wherein $P_1$ is a focal point of a paraboloid of the curved surface $S_1$ and $V_1$ is a cross point between the Z axis and the curved surface $S_1$, and in the vicinity of a focal point of the rotational paraboloid or parabola, rotational hyperboloid or hyperbolic curve, or alternatively, spherical surface or circle.

23. An image pickup device comprising an image pickup element in addition to the lens according to claim 4.

24. A lens according to claim 9, wherein the medium indicating negative refraction is a negative refractive index medium.

25. A lens according to claim 9, wherein the medium indicating negative refraction is a photonic crystal.

26. A lens according to claim 9, wherein the medium indicating negative refraction is a medium indicating complete image formation property.

27. A lens according to claim 9, wherein a light beam to be used is a light beam having a single wavelength.

* * * * *